(12) United States Patent
Kim et al.

(10) Patent No.: US 11,661,481 B2
(45) Date of Patent: *May 30, 2023

(54) POLYIMIDE FILM AND FLEXIBLE DISPLAY PANEL INCLUDING THE SAME

(71) Applicants: SK Innovation Co., Ltd., Seoul (KR); SK ie technology Co., Ltd., Seoul (KR)

(72) Inventors: Sun Kug Kim, Daejeon (KR); Min Sang Park, Daejeon (KR); Seung Min Jeon, Daejeon (KR); Jin Su Park, Daejeon (KR); Hyun Joo Song, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,703

(22) Filed: Jul. 28, 2021

(65) Prior Publication Data

US 2022/0033586 A1 Feb. 3, 2022

(30) Foreign Application Priority Data

Jul. 30, 2020 (KR) .................. 10-2020-0095316

(51) Int. Cl.
 *C08G 73/14* (2006.01)
 *C08G 73/10* (2006.01)
 *C08J 5/18* (2006.01)

(52) U.S. Cl.
 CPC ......... *C08G 73/14* (2013.01); *C08G 73/1032* (2013.01); *C08J 5/18* (2013.01); *C08J 2379/08* (2013.01)

(58) Field of Classification Search
 CPC ............ C08G 73/1032; C08G 73/1039; C08G 73/1078; C08G 73/14; C08J 2379/08; C08J 5/18; C08L 2203/16
 See application file for complete search history.

(56) References Cited

U.S. PATENT DOCUMENTS

| | | |
|---|---|---|
| 10,538,665 B2 | 1/2020 | Min et al. |
| 10,815,378 B2 | 10/2020 | Kim et al. |
| 2013/0202869 A1 | 8/2013 | Cho et al. |
| 2015/0344625 A1 | 12/2015 | Kino et al. |
| 2018/0013100 A1 | 1/2018 | Yim et al. |
| 2018/0044475 A1* | 2/2018 | Park .................. C08G 73/1042 |

FOREIGN PATENT DOCUMENTS

| | | |
|---|---|---|
| JP | 2006160975 A | 6/2006 |
| JP | 2006291164 A | 10/2006 |
| JP | 2007030501 A | 2/2007 |
| JP | 2015096877 A | 5/2015 |
| JP | 201945804 A | 3/2019 |
| KR | 1020090025504 A | 3/2009 |
| KR | 100926872 B1 | 11/2009 |
| KR | 1020130039939 A | 4/2013 |

(Continued)

*Primary Examiner* — Lawrence D Ferguson
(74) *Attorney, Agent, or Firm* — The Webb Law Firm

(57) ABSTRACT

Provided are a polyimide-based film, a window cover film, and a display panel including the same. More particularly, a polyimide-based film having excellent visibility, a window cover film using the same, and a display panel including the same are provided.

10 Claims, 7 Drawing Sheets

(56) References Cited

FOREIGN PATENT DOCUMENTS

| | | |
|---|---|---|
| KR | 1020150018240 A | 2/2015 |
| KR | 1020150104282 A | 9/2015 |
| KR | 1020150137700 A | 12/2015 |
| KR | 1020150138758 A | 12/2015 |
| KR | 1020160002386 A | 1/2016 |
| KR | 1020170028083 A | 3/2017 |
| KR | 1020180001175 A | 1/2018 |
| KR | 1020180005772 A | 1/2018 |
| KR | 1020180018307 A | 2/2018 |
| KR | 101839293 B1 | 3/2018 |
| KR | 101961115 B1 | 3/2019 |
| KR | 1020190029110 A | 3/2019 |
| KR | 101965449 B1 | 4/2019 |
| KR | 1020190090300 A | 8/2019 |
| KR | 1020190113018 A | 10/2019 |
| KR | 102147307 B1 | 8/2020 |

* cited by examiner

POLYIMIDE FILM AND FLEXIBLE DISPLAY PANEL INCLUDING THE SAME

CROSS-REFERENCE TO RELATED APPLICATION

This application claims priority to Korean Patent Application No. 10-2020-0095316 filed Jul. 30, 2020, the disclosure of which is hereby incorporated by reference in its entirety.

BACKGROUND OF THE INVENTION

Field of the Invention

The following disclosure relates to a polyimide-based film, a window cover film, and a display panel including the same.

More particularly, the following disclosure relates to a polyimide-based film having excellent visibility, a window cover film using the same, and a display panel including the same.

Description of Related Art

A thin display is implemented in the form of a touch screen panel and is used in various smart devices including smart phones, tablet PCs, and various wearable devices.

Display devices using the touch screen panel are provided with a window cover including tempered glass or a plastic film on a display panel for protecting the display panel from scratches or external shock.

Since the window cover is a constituent formed in the outermost part of the display device, thermal resistance, mechanical properties, and optical properties should be satisfied, and in particular, it is important for the window cover to have high display quality and not to cause light distortion such as a Mura phenomenon, a blackout phenomenon in which a screen looks black at a certain angle, or a rainbow phenomenon having iridescent stains.

In particular, as a coating layer is laminated on a substrate layer for imparting various physical properties, the window cover has problems of causing diffused reflection of light or the like, producing optical stains to worsen visibility, and causing eye strain when applied to a display.

Therefore, as a substitute for tempered glass or conventional organic materials, development of a window cover which may solve a light distortion problem, while retaining mechanical physical properties, thermal properties, and various optical properties, is still needed.

RELATED ART DOCUMENTS

Patent Documents (Patent Document 1) Korean Patent Laid-Open Publication. No. 10-2015-0104282 (Sep. 15, 2015)

SUMMARY OF THE INVENTION

An embodiment of the present invention is directed to providing a polyimide-based film having excellent visibility, and a window cover film and a display panel using the same.

Another embodiment of the present invention is directed to providing a polyimide-based film having a significantly improved rainbow or optical stain phenomenon, a window cover film using the same, and a display panel using the same.

Still another embodiment of the present invention is directed to providing a window cover film replacing tempered glass and the like, that is, a novel window cover film which may satisfy excellent mechanical physical properties and thermal properties and various optical properties, and also, may solve a light distortion problem.

As a result of a study for achieving the object, it was found that a window cover film which is an optical film having excellent visibility and quality may be provided, by providing a film having a standard deviation of an in-plane retardation (Ro) satisfying a specific range.

In one general aspect, a polyimide-based film satisfying both of the following physical properties is provided: a standard deviation of an in-plane retardation (Ro) per a unit area being less than 5 nm and the number of contour lines being 50 or less, based on a film having a size of 100×100 mm. In the range satisfying both physical properties, it was found that a transparent film with excellent visibility having less reflection mura and improved appearance quality may be provided.

The film according to the present invention does not particularly limit the production means as long as the physical properties are obtained, but taking one means obtaining the physical properties of the present invention as an example, it may be achieved by casting a polyimide-based resin solution and then adjusting a drying temperature and a wind speed during drying. More specifically, two steps or more of drying may be carried out, and the drying temperature and the wind speed may be set low during the first drying, more specifically, may be set at a temperature of 80 to 150° C. and a speed of 1 to 5 m/s. The temperature and the wind speed may be adjusted depending on the thickness of the film, but they are not limited to the ranges.

Other features and aspects will be apparent from the following detailed description, the drawings, and the claims.

DESCRIPTION OF THE INVENTION

Figure 1:
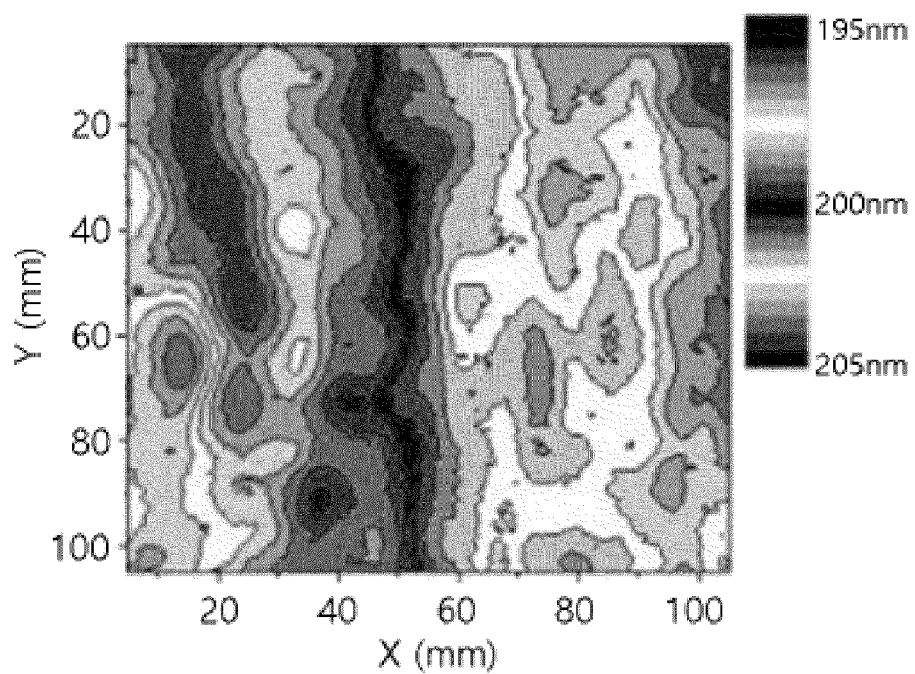
FIG. 1 illustrates a retardation of the film according to Example 1 of the present invention.

Hereinafter, the present disclosure will be described in detail. However, the following exemplary embodiment is only a reference for describing the present invention in detail, and the present invention is not limited thereto and may be implemented in various forms.

In addition, unless otherwise defined, all technical terms and scientific terms have the same meanings as those commonly understood by a person skilled in the art to which the present invention pertains.

The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, a polyimide-based resin is used as a term including polyimide or polyamide-imide. A polyimide-based film is used as a term having a meaning encompassing a polyimide film or a polyamide-imide film.

In the present invention, a "polyimide-based resin solution" is used in the same meaning as a "composition for forming a polyimide-based film" and a "polyamide-imide solution". In addition, a polyimide-based resin and a solvent may be included for forming the polyimide-based film.

In the present invention, a "film" is obtained by applying the "polyimide-based resin solution" on a substrate, drying it, and carrying out peeling off, and may be stretched or unstretched.

The inventors of the present invention conducted many studies for solving the above problems, and as a result, found that a transparent film with excellent visibility having improved appearance quality may be provided, in a range of satisfying both of the following, as the physical properties of a window cover film used in a display: a standard deviation of an in-plane retardation (Ro) per a unit area being less than 5 nm and the number of contour lines being 50 or less, thereby completing the present invention. The standard deviation of the in-plane retardation (Ro) and the number of contour lines refer to those measured by the measurement method described in the Examples described later.

It was found that by satisfying the range, a window cover film having excellent optical physical properties, which has excellent visibility and hardly produces rainbow mura due to color unevenness showing uneven color and stains, may be provided.

In the range of the standard deviation of more than 5 nm, the number of contour lines is also more than 50, and within the range, reflection mura occurs a lot to deteriorate visibility and optical stains such as rainbow mura occur.

Hereinafter, a polyimide-based film satisfying all of the physical properties of the present invention and a method of producing a film having the properties of the present invention will be described.

<Polyimide-Based Film>

In an exemplary embodiment of the present invention, the polyimide-based film may have an in-plane retardation of 300 nm or less, more preferably 0 to 300 nm, as measured at a wavelength of 550 nm. Within the range, reflection mura like contour lines occurs less in a normal line direction of the film, and optical properties appropriate for use as a window cover film of a flexible display and the like may be provided.

In addition, when the film has retardation in the above range, a sunglass free function allowing us to watch a display from all angles even with polarized sunglasses on may be provided. When we watch a display with polarized sunglasses on, sometimes a screen may be blocked at a certain viewing angle, and it is because a polarizing plate used in the display and the optical axis of the polarized sunglass are perpendicular to each other so that light is blocked. When the film has the range of retardation, a polarization state of light emitted from the polarizing plate is changed from a linear shape to an oval shape, so that a function to allow us to watch a display from all angles even with polarized sunglasses on may be provided.

The in-plane retardation is a parameter defined as a product ($\Delta Nxy \times d$) of anisotropy of refractive indexes of two orthogonal axes on a film ($\Delta Nxy = |Nx-Ny|$) and a film thickness d (nm), which is a measure showing optical isotropy and anisotropy. The in-plane retardation (Ro) is an in-plane retardation value at a wavelength of 550 nm and represented by the following Equation 1:

$$Ro=(nx-ny)\times d \qquad \text{[Equation 1]}$$

wherein nx is a refractive index in one-axis (x-axis) direction in a film plane, ny is a refractive index in one-axis direction orthogonal to the x-axis in the film plane, and d is a film thickness (nm).

In an exemplary embodiment of the present invention, the polyimide-based film may have a thickness of 10 to 500 μm, 20 to 250 μm, or 30 to 110 μm.

In addition, the polyimide-based film of the present invention may have a modulus in accordance with ASTM D882 of 3 GPa or more, 4 GPa or more, 5 GPa or more, 6 GPa or more, or 7 GPa or more, an elongation at break of 8% or more, 12% or more, or 15% or more, a light transmittance of 80% or less, 75% or less, or 5 to 80% as measured at 388 nm in accordance with ASTM D1746, a total light transmittance of 87% or more, 88% or more, or 89% or more as measured at 400 to 700 nm, a haze in accordance with ASTM D1003 of 2.0% or less, 1.5% or less, or 1.0% or less, a yellow index in accordance with ASTM E313 of 5.0 or less, 3.0 or less, or 0.4 to 3.0, and a b* value of 2.0 or less, 1.3 or less, or 0.4 to 1.3. Within the range, the film has excellent physical properties to replace conventional tempered glass or a conventional polyimide-based film as a window film.

In an exemplary embodiment of the present invention, the polyimide-based film is a polyimide-based resin, in particular, a polyimide-based resin having a polyamide-imide structure.

Preferably, the polyimide-based film may be a polyamide-imide-based resin including a fluorine atom and an aliphatic cyclic structure.

In an exemplary embodiment of the present invention, the polyamide-imide-based resin including a fluorine atom and an aliphatic cyclic structure may include a unit derived from a fluorine-based aromatic diamine, a unit derived from an aromatic dianhydride, and a unit derived from an aromatic diacid dichloride.

More preferably, in an exemplary embodiment of the present invention, as the polyamide-imide-based resin including a fluorine atom and an aliphatic cyclic structure, it is preferred to use a quaternary copolymer including a unit derived from a fluorine-based aromatic diamine, a unit derived from an aromatic dianhydride, a unit derived from a cycloaliphatic dianhydride, and a unit derived from an aromatic diacid dichloride, since it is more appropriate for expressing the physical properties to be desired.

In an exemplary embodiment of the present invention, as an example of the polyamide-imide-based resin including a fluorine atom and an aliphatic cyclic structure, a polyamide-imide polymer is preferred, which is prepared by preparing an amine-terminated polyamide oligomer derived from a first fluorine-based aromatic diamine and an aromatic diacid dianhydride and polymerizing the amine-terminated polyamide oligomer with monomers derived from a second fluorine-based aromatic diamine, an aromatic dianhydride, and a cycloaliphatic dianhydride, since the object of the present invention is achieved better.

The first fluorine-based aromatic diamine and the second fluorine-based aromatic diamine may be the same or different kinds. More specifically, an exemplary embodiment of the polyimide-based resin may include a block consisting of an amine-terminated polyamide oligomer derived from a first fluorine-based aromatic diamine and an aromatic diacid dichloride and a polyimide unit at both ends, and a content of the block may be 50% or more, based on the mass.

In an exemplary embodiment of the present invention, when the amine-terminated oligomer having an amide structure in a polymer chain formed by the aromatic diacid dichloride is included as the monomer of the diamine, not only optical physical properties but also, in particular, mechanical strength including the modulus, may be improved, and also the dynamic bending properties may be further improved.

In an exemplary embodiment of the present invention, when the polyamide oligomer block is included, a mole ratio between a diamine monomer including the amine-terminated polyoligomer and the second fluorine-based aromatic diamine and a dianhydride monomer including the aromatic dianhydride and the cycloaliphatic dianhydride of the present invention may be 1:0.9 to 1.1, preferably 1:1.

In addition, a content of the amine-terminated polyamide oligomer with respect to the entire diamine monomer is not particularly limited, but it is preferred to include the amine-terminated polyamide oligomer at 30 mol % or more, preferably 50 mol % or more, and more preferably 70 mol % or more for satisfying the mechanical physical properties, the yellow index, and the optical properties of the present invention.

In addition, a composition ratio of the aromatic dianhydride and the cycloaliphatic dianhydride is not particularly limited, but a ratio of 30 to 80 mol %:70 to 20 mol % is preferred considering the transparency, the yellow index, and the mechanical physical properties of the present invention, but the present invention is not necessarily limited thereto.

In addition, the present invention may be a polyamide-imide-based resin including a fluorine atom and an aliphatic cyclic structure, which is a polyamide-imide-based resin obtained by mixing, polymerizing, and imidizing the fluorine-based aromatic diamine, the aromatic dianhydride, the cycloaliphatic dianhydride, and the aromatic diacid dichloride.

The resin has a random copolymer structure, in which 40 mol or more, preferably 50 to 80 mol of the aromatic diacid dichloride may be used with respect to 100 mol of the diamine, a content of the aromatic dianhydride may be 10 to 50 mol, and a content of the cyclic aliphatic dianhydride may be 10 to 60 mol, and may be prepared by carrying out polymerization at a mole ratio of a sum of a diacid chloride and a dianhydride to the diamine monomer of 1:0.9 to 1.1. Preferably, the polymerization may be carried out at 1:1.

The random polyamide-imide of the present invention is somewhat different in the optical properties such as transparency, the mechanical physical properties, and the retardation range as compared with the block polyamide-imide resin, but may belong to the scope of the present invention.

In an exemplary embodiment of the present invention, as the fluorine-based aromatic diamine component, a mixture of 2,2'-bis(trifluoromethyl)-benzidine and another known aromatic diamine component may be used, or 2,2'-bis(trifluoromethyl)-benzidine may be used alone. By using the fluorine-based aromatic diamine as such, excellent optical properties may be further improved and the yellow index may be improved, based on the mechanical physical properties required in the present invention, as the polyamide-imide-based film. In addition, the tensile modulus of the polyamide-imide-based film may be improved to further improve the mechanical strength and to further improve the dynamic bending property of the hard coating film.

As the aromatic dianhydride, at least one or two or more of 4,4'-hexafluoroisopropylidene diphthalic anhydride (6FDA) and biphenyltetracarboxylic dianhydride (BPDA), oxydiphthalic dianhydride (ODPA), sulfonyl diphthalic anhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxylphenyl) dimethyl silane dianhydride (SiDA), and bis(dicarboxyphenoxy) diphenyl sulfide dianhydride (BDSDA) may be used, but the present invention is not limited thereto.

As an example of the cycloaliphatic dianhydride, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-en-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof may be used, but the present invention is not limited thereto.

In an exemplary embodiment of the present invention, when the amide structure in the polymer chain is formed by the aromatic diacid dichloride, not only the optical physical properties but also the mechanical strength, particularly including the modulus, may be greatly improved, and also the dynamic bending properties may be further improved, which is thus preferred.

As the aromatic diacid dichloride, any one or a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof may be used, but the present invention is not limited thereto.

A weight average molecular weight of the polyimide resin in the present invention is not particularly limited, but may be 200,000 g/mol or more, preferably 300,000 g/mol or more, and more preferably 200,000 to 500,000 g/mol. In addition, a glass transition temperature is not limited, but may be 300 to 400° C., more specifically 330 to 380° C. Within the range, since a film with a higher modulus, better mechanical strength, and better optical physical properties, and being less curled may be provided, which is more preferred, but the present invention is not necessarily limited thereto.

<Method of Producing Polyimide-Based Film>

Hereinafter, a method of producing a polyimide-based film having the properties of the present invention will be illustrated.

In an exemplary embodiment of the present invention, the polyimide-based film may be prepared by applying a "polyimide-based resin solution" including a polyimide-based resin and a solvent on a substrate, and then performing drying or drying/stretching. That is, the substrate layer may be prepared by a solution casting method.

As an example, the method may include the following: an amine-terminated oligomer preparation step of reacting a fluorine-based aromatic diamine and an aromatic diacid dichloride to prepare an oligomer; a step of reacting the thus-prepared oligomer with the fluorine-based aromatic diamine, an aromatic dianhydride, and a cycloaliphatic dianhydride to prepare a polyamic acid solution; a step of imidizing the polyamic acid solution to prepare a polyamide-imide resin; and a step of applying a polyamide-imide solution in which the polyamide-imide resin is dissolved in an organic solvent to form a film.

Hereinafter, each step will be described in more detail, taking a case of producing a block polyamide-imide film as an example.

The step of preparing an oligomer may include reacting the fluorine-based aromatic diamine and the aromatic diacid dichloride and purifying and drying the obtained oligomer. In this case, the fluorine-based aromatic diamine may be introduced at a mole ratio of 1.01 to 2 with respect to the aromatic diacid dichloride to prepare an amine-terminated polyamide oligomer monomer. A molecular weight of the oligomer monomer is not particularly limited, but for example, when the weight average molecular weight is in a range of 1000 to 3000 g/mol, better physical properties may be obtained.

In addition, it is preferred to use an aromatic carbonyl halide monomer such as terephthaloyl chloride or isophthaloyl chloride, not terephthalic ester or terephthalic acid itself for introducing an amide structure, and this is, though is not clear, considered to have an influence on the physical properties of the film by a chlorine element.

Next, the step of preparing a polyamic acid may be carried out by a solution polymerization reaction in which the thus-prepared amine-terminated fluorine-based polyamide oligomer is reacted with the fluorine-based aromatic diamine, the aromatic dianhydride, and the cycloaliphatic dianhydride in an organic solvent. Here, the organic solvent used for the polymerization reaction may be, as an example, any one or two or more polar solvents selected from dimethylacetamide (DMac), N-methyl-2-pyrrolidone (NMP), dimethylformamide (DMF), dimethyl sulfoxide (DMSO), ethyl cellosolve, methyl cellosolve, acetone, diethyl acetate, m-cresol, and the like.

Next, a step of carrying out imidization to prepare a polyamide-imide resin may be carried out by chemical imidization, and more preferably, a polyamic acid solution is chemically imidized using pyridine and an acetic anhydride. Subsequently, imidization may be carried out using an imidization catalyst and a dehydrating agent at a low temperature of 150° C. or lower, preferably 100° C. or lower, and more specifically 50 to 150° C.

By the method as such, uniform mechanical physical properties may be imparted to the entire film as compared with the case of an imidization reaction by heat at a high temperature.

As the imidization catalyst, any one or two or more selected from pyridine, isoquinoline, and β-quinoline may be used. In addition, as the dehydrating agent, any one or two or more selected from an acetic anhydride, a phthalic anhydride, a maleic anhydride, and the like may be used, but the present invention is not necessarily limited thereto.

In addition, an additive such as a flame retardant, an adhesion improver, inorganic particles, an antioxidant, a UV inhibitor, and a plasticizer may be mixed with the polyamic acid solution to prepare the polyamide-imide resin.

In addition, after the imidization, the resin is purified using a solvent to obtain a solid content, which may be dissolved in a solvent to obtain a polyamide-imide solution. The solvent may include N,N-dimethyl acetamide (DMAc) and the like, but is not limited thereto.

The step of forming a film from the polyamide-imide solution is carried out by applying the polyamide-imide solution on a substrate, and then drying the solution in a drying step divided into a dry area. In addition, stretching may be carried out before or after the drying, and a heat treatment step may be further carried out after the drying or stretching step. As the substrate, for example, glass, stainless, a film, or the like may be used, but the present invention is not limited thereto. Application may be carried out by a die coater, an air knife, a reverse roll, a spray, a blade, casting, gravure, spin coating, and the like.

Hereinafter, a method of producing a polyimide-based film having a retardation standard deviation of less than 5 nm by forming a polyimide-based solution into a film will be described.

In the present invention, the production means is not particularly limited as long as the physical properties are obtained, but taking one means for obtaining the physical properties of the present invention as an example, it may be achieved by casting a polyimide-based resin solution, and then adjusting a drying temperature, a drying wind volume, and the like to adjust a drying speed, simultaneously with adjusting a flow rate during casting in a casting die, thereby adjusting a film thickness.

More specifically, the polyamide-imide solution is cast on a carrier film such as a polyethylene terephthalate film or a polyimide film or a stainless steel belt (SUS belt) and then a drying speed is adjusted to adjust the physical properties of the film. Here, the drying speed may be adjusted depending on the thickness of the film, and more specifically, two or more steps of drying may be carried out. Here, a drying temperature and a wind speed during first drying are set lower than those during second drying, so that the film may be slowly dried at the beginning, and more specifically, the film may be dried at 80 to 150° C. at a wind speed of 1 to 5 m/s. In addition, the drying temperature and wind speed during the second drying may be higher than those during the first drying, and specifically, for example, the second drying may be carried out at 200 to 300° C. at a wind speed of 3 to 20 m/s. The temperature and the wind speed may be adjusted depending on the thickness of the film, but they are not limited to the ranges.

<Window Cover Film>

Another exemplary embodiment of the present invention provides a window cover film including: the polyimide-based film described above; and a coating layer formed on the polyimide-based film.

The coating layer is for imparting functionality of the window cover film, and may be variously applied depending on the purpose. Specifically, for example, the coating layer may include any one or more layers selected from a hard coating layer, an antistatic layer, a restoration layer, a shock diffusion layer, a self-cleaning layer, an anti-fingerprint layer, an antifouling layer, an anti-scratch layer, a low-refractive layer, an anti-reflective layer, an shock absorption layer, and the like, but is not limited thereto.

The coating layer may be used without limitation as long as it is commonly used in the art.

<Display Device>

Another exemplary embodiment of the present invention provides a display device including: a display panel and the window cover film described above formed on the display panel.

In an exemplary embodiment of the present invention, the display device is not particularly limited as long as it belongs to a field requiring excellent optical properties, and may be provided by selecting a display panel appropriate therefor. Preferably, the window cover film may be applied to a flexible display device, and specifically, for example, may be included and applied to any one or more image displays selected from various image displays such as a liquid crystal display, an electroluminescence display, a plasma display, and a field emission display device, but is not limited thereto.

Hereinafter, the present invention will be described in more detail with reference to the Examples and Comparative Examples. However, the following Examples and Comparative Examples are only an example for describing the present invention in more detail, and do not limit the present invention in any way.

1) Modulus/Elongation at Break

It was measured by measured using UTM 3365 available from Instron, under the condition of pulling a polyamide-imide film having a thickness of 50 μm, a length of 50 mm, and a width of 10 mm at 25° C. at 50 mm/min, in accordance with ASTM D882. The unit of the modulus was GPa and the unit of the elongation at break was %.

2) Light Transmittance

A total light transmittance was measured at the entire wavelength region of 400 to 700 nm using a spectrophotometer (Nippon Denshoku, COH-400) on a film having a thickness of 50 μm, in accordance with the standard of ASTM D1003. In addition, a light transmittance at a single wavelength was measured at 388 nm using UV/Vis (Shimadzu, UV3600) in accordance with ASTM D1746. The unit was %.

3) Haze

In accordance with the standard of ASTM D1003, the haze was measured using a spectrophotometer (from Nippon Denshoku, COH-400), on a film having a thickness of 50 μm. The unit was %.

4) Yellow Index (YI) and b* Value

The yellow index and the b* value were measured using a colorimeter (from HunterLab, ColorQuest XE), on a film having a thickness of 50 μm, in accordance with the standard of ASTM E313.

5) Weight Average Molecular Weight (Mw) and Polydispersity Index (PDI)

The weight average molecular weight and the polydispersity index of the produced films were measured as follows.

First, a film sample was dissolved in a DMAc eluent containing 0.05 M LiBr and used as a sample.

Measurement was performed by using GPC (Waters GPC system, Waters 1515 isocratic HPLC Pump, Waters 2414 Refractive Index detector), connecting Olexis, polypore, and mixed-D columns as a GPC column, using a DMAc solution as a solvent, and using polymethylmethacrylate (PMMA STD) as a standard, and analysis was performed at a flow rate of 1 mL/min at 35° C.

6) Pencil Hardness

For the films produced in Examples and Comparative Examples, according to JIS K5400, a line of 20 mm was drawn at a rate of 50 mm/sec on the film using a load of 750 g, this operation was repeated 5 times or more, and the pencil hardness was measured based on the case in which scratches occurred once or less.

7) Measurement of Residual Solvent Content

For a residual solvent content, a value obtained by subtracting a weight at 370° C. from a weight at 150° C. using TGA (Discovery from TA) was determined as a residual solvent content in the film. Here, measurement conditions were heated up to 400° C. at a heating rate of 10° C./min and a weight change in a region from 150 to 370° C. was measured.

8) Retardation Standard Deviation

A retardation property was measured using Axoscan (OPMF, Axometrics Inc.). A sample having an appropriate size was placed on a stage and an in-plane retardation (Ro) at 550 nm was measured. A light source of a 1 mm beam size was used, and an automized XY stage was used for an area of 100×100 mm² to move the sample at intervals of 1 mm and measure the retardation for the entire surface. A standard deviation was calculated from the thus-measured retardation value, using the following Equation:

$$\sigma = \sqrt{\frac{\sum_{i=1}^{n}(x_i - \bar{x})^2}{n-1}}$$

wherein σ: standard deviation, n: measured number, $\bar{x}$: average of measured values, and measured data (1-n).

9) Observation of Mura Phenomenon (Visibility)

I-Phone X (apple) was used to turn on a white light, and mura for each viewing angle was observed in a state in which the produced polyimide film was laminated thereon. For mura observation, 5 people were selected and instructed to observe mura in the same dark room. When 5 people determined it to be good, it was evaluated as good (O), when less than 4 people determined it to be good, it was evaluated as somewhat poor (Δ), and less than 3 people determined it to be good, it was evaluated as poor (x).

10) Observation of Rainbow

One surface of a film was blackened, and then it was visually observed whether rainbow occurred under a three-wavelength lamp in a dark room.

Good: no rainbow seen, uniform color shown

Poor: strong rainbow seen, strong color shown

11) Number of Contour Lines

The number of contour lines was measured using retardation mapping results measured on a film having area of 100×100 mm with Axoscan (OPMF, Axometrics Inc.). The retardation mapping results were measured identically to the retardation property in 8) above.

Figure 7:
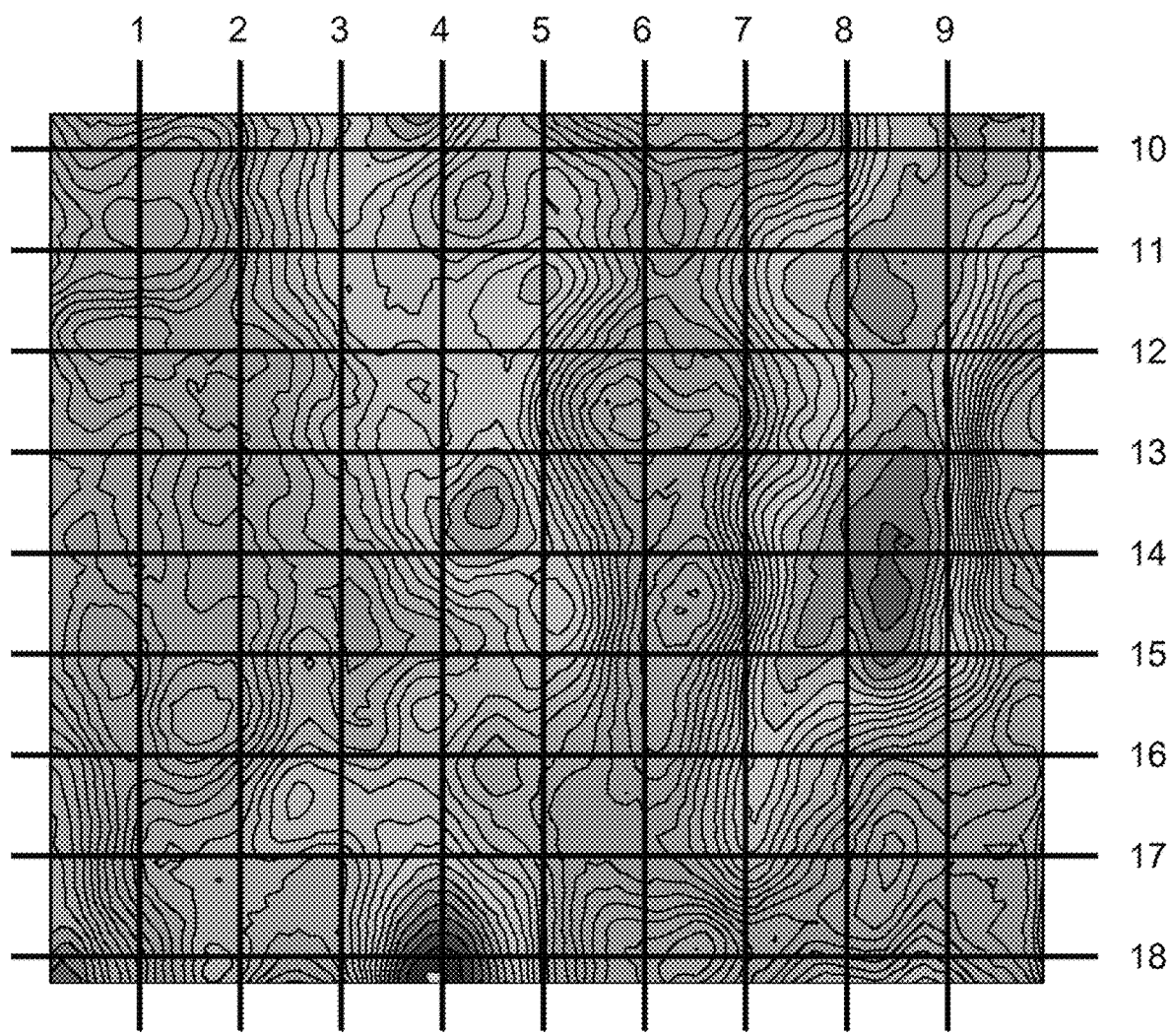
FIG. 7 illustrates an example for observing reflection mura.

As shown in FIG. 7, 9 grids at 10 mm intervals were drawn on the retardation mapping results, horizontally and vertically, respectively, so that a total of 18 grids were drawn. The number of points where a contour line and a grid met, respectively for a total of 18 lines, was set as the number of contour lines. Determination was made from the value of the grid having the largest number of contour lines of the 18 grids, as follows:

Good: the number of contour lines of 50 or less and a small brightness difference between a bright portion and a dark portion Poor: the number of contour lines of more than 50 and a large brightness difference between a bright portion and a dark portion Example 1

Terephthaloyl dichloride (TPC) and 2,2'-bis(trifluoromethyl)-benzidine (TFMB) were added to a mixed solution of dichloromethane and pyridine in a reactor, and stirring was performed at 25° C. for 2 hours under a nitrogen atmosphere. Here, a mole ratio of TPC:TFMB was 300:400, and a solid content was adjusted to 15 wt %. Thereafter, the reactant was precipitated in an excessive amount of methanol and filtered to obtain a solid content, which was dried under vacuum at 50° C. for 4 hours or more to obtain an oligomer, and the prepared oligomer had a formula weight (FW) of 1720 g/mol.

N,N-dimethylacetamide (DMAc), 100 mol of the oligomer, and 28.6 mol of 2,2'-bis(trifluoromethyl)-benzidine (TFMB) were added to the reactor and sufficient stirring was performed. After confirming that the solid raw material was completely dissolved, fumed silica (surface area of 95 m²/g, <1 μm) was added to DMAc at a content of 1000 ppm relative to the solid content, and added to the reactor after being dispersed using ultrasonic waves. 64.3 mol of cyclobutanetetracarboxylic dianhydride (CBDA) and 64.3 mol of 4,4'-hexafluoroisopropylidene diphthalic anhydride (6FDA) were subsequently added, sufficient stirring was performed, and the mixture was polymerized at 40° C. for 10 hours. Here, the solid content was 15%. Subsequently, each of pyridine and acetic anhydride was added sequentially at 2.5-fold relative to the total content of dianhydride, and stirring was performed at 60° C. for 12 hours.

After the polymerization was completed, the polymerization solution was precipitated in an excessive amount of methanol and filtered to obtain a solid content, which was dried under vacuum at 50° C. for 6 hours or more to obtain polyamide-imide powder. The powder was diluted and dissolved at 20 wt % in DMAc to prepare a polyimide-based resin solution.

The thus-prepared polyimide-based resin solution was coated on a stainless steel plate having a width of 300 mm with a slot die, and was first dried by being allowed to stay in an air-circulated dry oven heated to a temperature of 90° C. for 90 minutes. During the first drying, a wind speed of convection air in the drying oven was 2 m/s. For completely removing a solvent remaining in the film, the film was allowed to stay in the drying oven heated to 280° C. to complete second drying. During the second drying, $N_2$ purge was performed simultaneously for preventing deterioration of the film, and the wind speed was 4 m/s. The dried film was cooled to room temperature, and detached from the stainless steel plate to produce a film.

The residual solvent content of the produced film was 1.1 wt %. The thus-produced polyamide-imide film had a thickness of 50 μm, a transmittance at 388 nm of 72%, a total light transmittance of 90%, a haze of 0.3%, a yellow index (YI) of 1.5, a b* value of 1.0, a modulus 7 GPa, an elongation at break of 22%, a weight average molecular weight of 312,000 g/mol, a polydispersity index (PDI) of 2.2, and a pencil hardness of H/750 g.

In addition, as a result of evaluating reflection mura, the number of contour lines was 27, and no rainbow was observed to confirm that visibility was excellent.

Figure 2:
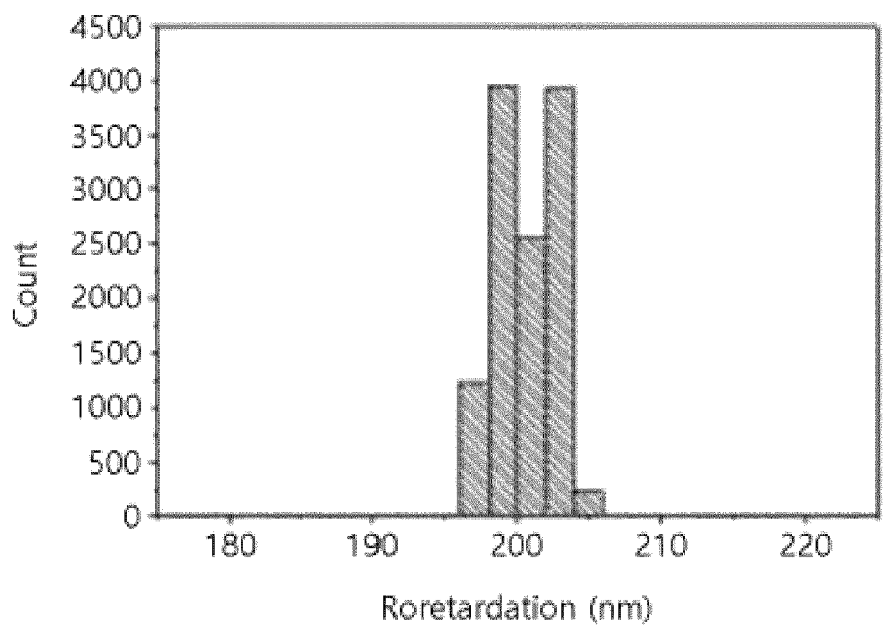
FIG. 2 illustrates a retardation distribution of the film according to Example 1 of the present invention.

In addition, retardation mapping results are shown in FIG. 1, and a retardation distribution is shown in FIG. 2.

Examples 2 and 3

Films were produced in the same manner as in Example 1, except that the thickness of the film and the drying conditions were adjusted as shown in Table 1.

As a result of evaluating the reflection mura of Examples 2 and 3, the number of contour lines was 35 and 37, respectively, and no rainbow was observed to confirm that visibility was excellent.

Figure 3:
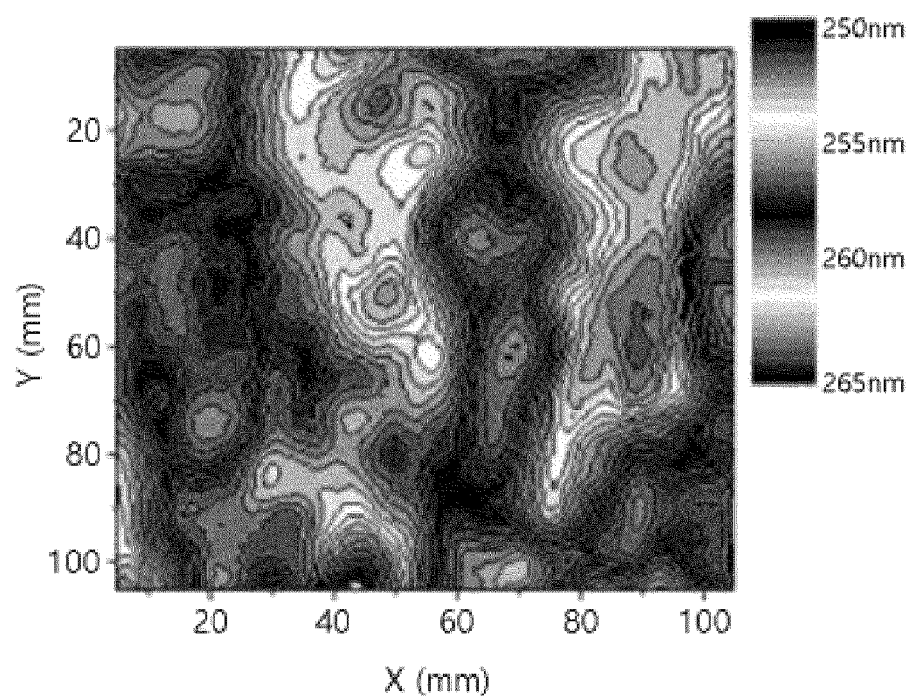
FIG. 3 illustrates a retardation of the film according to Example 2 of the present invention.
Figure 4:
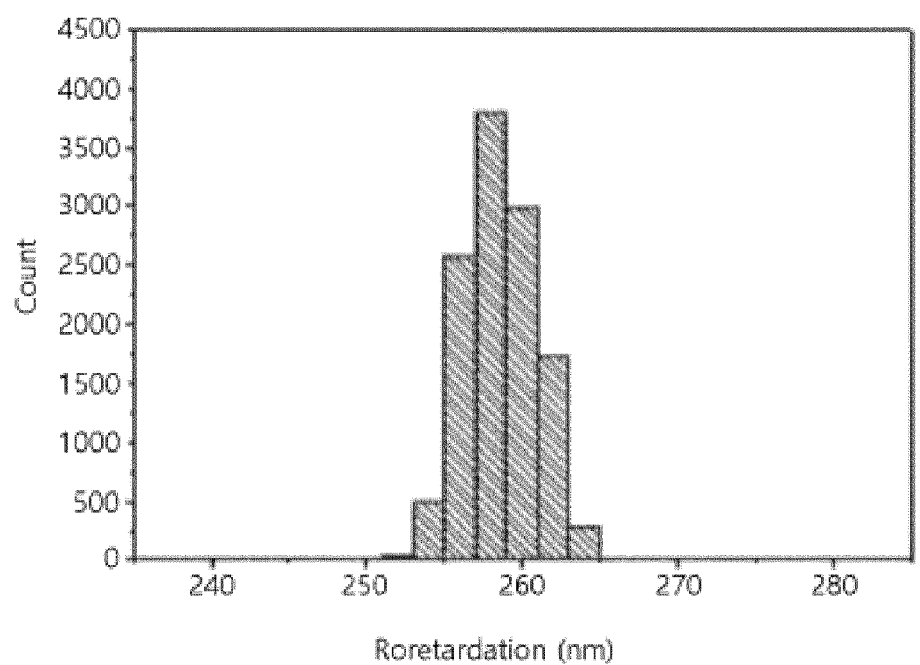
FIG. 4 illustrates a retardation distribution of the film according to Example 2 of the present invention.

In addition, retardation mapping results of Example 2 are shown in FIG. 3, and a retardation distribution is shown in FIG. 4.

Comparative Examples 1 to 3

Films were produced in the same manner as in Example 1, except that the drying conditions were adjusted as shown in Table 1.

As a result of evaluating the reflection mura of Comparative Example 1, it was confirmed that the number of contour lines was larger than those of Examples 1 and 2, the contour lines were formed very densely, the number of contour lines was 50 or more, and the contour lines were seen clear and strong.

Figure 5:
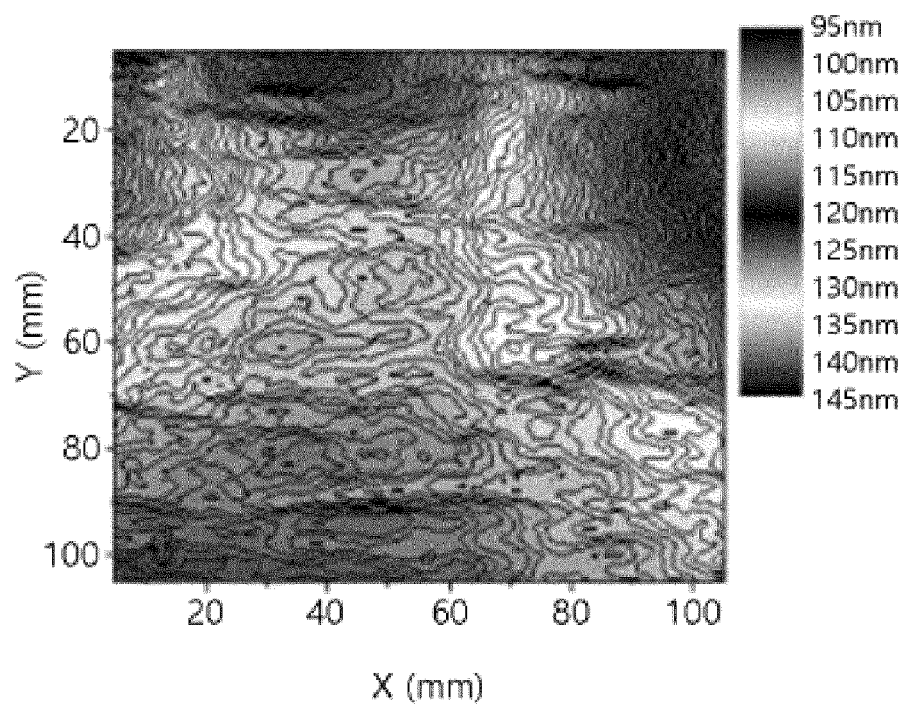
FIG. 5 illustrates a retardation of the film according to Comparative Example 1 of the present invention.
Figure 6:
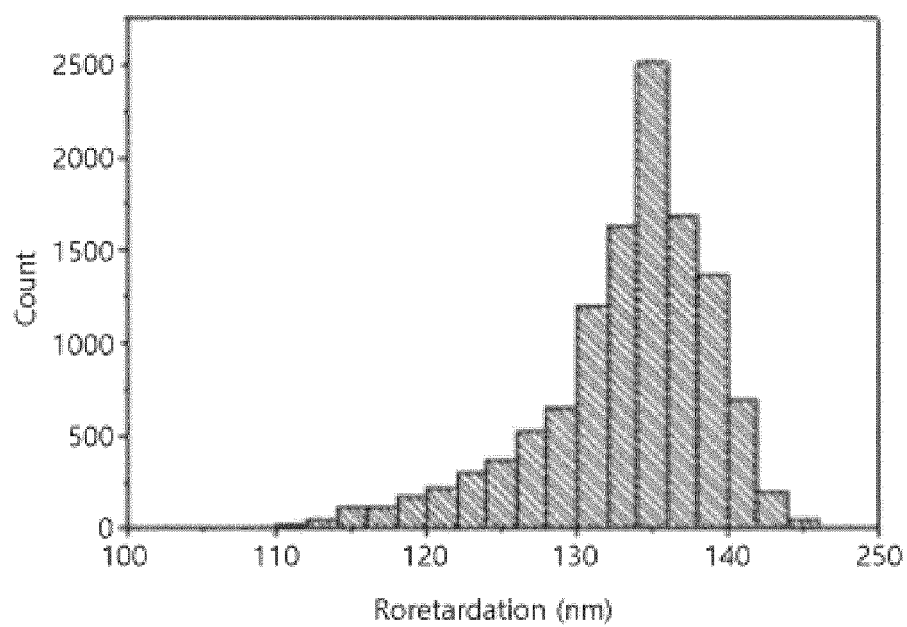
FIG. 6 illustrates a retardation distribution of the film according to Comparative Example 1 of the present invention.

In addition, retardation mapping results are shown in FIG. 5, and a retardation distribution is shown in FIG. 6.

It was found that visibility was poor and rainbow occurred in Comparative Example 1 in which the number of contour lines was large and the contour lines were formed densely, as compared with Examples 1 and 2. In addition, considering that the mapping results of retardation matched well with the results of observing reflection mura, it is determined that the standard deviation of retardation has an influence on the reflection mura performance.

TABLE 1

| | Example 1 | Example 2 | Example 3 | Comparative Example 1 | Comparative Example 2 | Comparative Example 3 |
| --- | --- | --- | --- | --- | --- | --- |
| Film thickness (μm) | 50 | 80 | 50 | 50 | 50 | 50 |
| First drying temperature (° C.) | 90 | 110 | 90 | 100 | 110 | 90 |
| Drying wind speed (m/s) | 2.0 | 2.0 | 2.0 | 2.0 | 2.0 | 4.0 |
| Reflection mura | Good | Good | Good | Poor | Poor | Poor |
| Retardation standard deviation (nm) | 1.9 | 2.1 | 2.8 | 5.0 | 5.7 | 6.4 |
| Number of contour lines | 27 | 35 | 37 | 65 | 71 | 83 |

TABLE 1-continued

|  | Example 1 | Example 2 | Example 3 | Comparative Example 1 | Comparative Example 2 | Comparative Example 3 |
|---|---|---|---|---|---|---|
| In-plane retardation (nm) | 200 | 135 | 155 | 213 | 235 | 251 |
| Rainbow Visibility | Good ○ | Good ○ | Good ○ | Poor x | Poor x | Poor x |

The polyimide-based film according to the present invention may have excellent visibility and significantly improve a rainbow phenomenon.

The window cover film according to the present invention may have excellent display quality even when a coating layer is formed on the polyimide-based film, may reduce a rainbow phenomenon in which iridescent stains occur on a display unit, or the like, and has improved appearance quality.

In addition, the polyimide-based film and the window cover film including the same according to the present invention may be applied to various display fields with excellent optical properties and visibility.

In addition, the window cover film of the present invention may satisfy excellent mechanical properties, thermal properties, and various optical physical properties such as transparency and a yellow index, and also, may provide an excellent visibility property, so as to be applied to various displays.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polyimide-based film, which has a standard deviation of an in-plane retardation (Ro) per a unit area of less than 5 nm and the number of contour lines of 50 or less, based on a film having a size of 100 ×100 mm,
   wherein the polyimide-based film has a modulus in accordance with ASTM D882 of 3 GPa or more, an elongation at break of 8% or more, a light transmittance of 80% or less as measured at 388 nm in accordance with ASTM D1746, a total light transmittance of 87% or more as measured at 400 to 700 nm, a haze of 2.0% or less, a yellow index of 5.0 or less, and a b* value of 2.0 or less.

2. The polyimide-based film of claim 1, wherein the polyimide-based film has the in-plane retardation of 300 nm or less as measured at a wavelength of 550 nm.

3. The polyimide-based film of claim 2, wherein the polyimide-based film has the in-plane retardation of 0 to 300 nm as measured at a wavelength of 550 nm.

4. The polyimide-based film of claim 1, wherein the polyimide-based film is formed of a polyamide-imide-based resin.

5. The polyimide-based film of claim 4, wherein the polyimide-based film comprises a unit derived from a fluorine-based aromatic diamine, a unit derived from an aromatic dianhydride, and a unit derived from an aromatic diacid dichloride.

6. The polyimide-based film of claim 5, wherein the polyimide-based film further comprises a unit derived from a cycloaliphatic dianhydride.

7. The polyimide-based film of claim 1, wherein the polyimide-based film has a thickness of 30 to 110 μm.

8. A window cover film comprising the polyimide-based film of claim 1.

9. The window cover film of claim 8, wherein the window cover film has any one or more coating layers selected from a hard coating layer, an antistatic layer, a restoration layer, a shock diffusion layer, a self-cleaning layer, an anti-fingerprint layer, an antifouling layer, an anti-scratch layer, a low-refractive layer, an anti-reflective layer, and an shock absorption layer on at least one surface of the polyimide-based film.

10. A flexible display panel comprising the polyimide-based film of claim 1.

\* \* \* \* \*